(12) United States Patent
Laslo

(10) Patent No.: US 6,214,097 B1
(45) Date of Patent: *Apr. 10, 2001

(54) FLUE GAS SCRUBBING APPARATUS

(75) Inventor: Dennis J. Laslo, Lebanon, PA (US)

(73) Assignee: Marsulex Environmental Technologies, LLC, Lebanon, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/335,589

(22) Filed: Nov. 8, 1994

(51) Int. Cl.[7] .......................... B01D 47/06; B01D 47/14
(52) U.S. Cl. .................... 96/236; 96/265; 96/267; 96/356
(58) Field of Search ............... 55/220, 223, 227–229, 55/257.1, 259; 423/242.1, 243.01, 243.03; 96/235, 236, 265, 267, 356

(56) References Cited

U.S. PATENT DOCUMENTS

| | | | |
|---|---|---|---|
| 1,170,308 | * | 2/1916 | Mertz .................................. 55/257.1 |
| 2,687,184 | * | 8/1954 | Hutchinson et al. .................. 55/223 |
| 3,138,442 | * | 6/1964 | Krantz .................................. 55/227 |
| 3,795,089 | * | 3/1974 | Reither ................................. 55/227 |
| 3,971,642 | * | 7/1976 | Perez .................................... 55/223 |
| 4,039,307 | * | 8/1977 | Bondor ........................... 55/257.1 X |
| 4,049,399 | * | 9/1977 | Teller ............................... 55/223 X |
| 4,255,168 | | 3/1981 | Nguyen . |
| 4,539,024 | * | 9/1985 | Stehning et al. ...................... 55/223 |
| 4,539,184 | * | 9/1985 | Stehninig ........................ 55/223 X |
| 4,968,335 | * | 11/1990 | Fujimoto et al. ...................... 55/223 |
| 5,240,482 | * | 8/1993 | Sung ................................... 55/228 |

FOREIGN PATENT DOCUMENTS

| | | |
|---|---|---|
| 1769945 | 4/1972 | (DE) . |
| 54-42364 | 4/1979 | (JP) . |
| 58-177106 | 10/1983 | (JP) . |
| 62-102820 | 5/1987 | (JP) . |

OTHER PUBLICATIONS

"Influence of Power Input on Efficiency of Dust Scrubbers", Stanford Research Institute, Menlo Park, CA., vol. 50, No. 11, Nov. 1958.

"Revolutionary New Wet System from IHI", FGD and DeNOx Newsletter, No. 198, 1–2 (Oct. 1994).

* cited by examiner

Primary Examiner—Robert H. Spitzer

(57) ABSTRACT

A gas-liquid contactor is provided for removing gases and particulate matter from flue gases, such as those which are produced by processing operations of the type carried out in utility and industrial facilities. The gas-liquid contactor includes a tower into which a slurry is introduced for absorbing gases and particulate matter, and is configured so as to eliminate the requirement for a pump to deliver the slurry to the tower. In addition, the tower is configured to accommodate a maximum flue gas flow velocity through the tower while maintaining proper operation of the tower. Liquid particles in which the gases and particulate matter are entrained are collected in a tank, through which the slurry is recycled to the tower. The level of the slurry within the tank is higher than the entry point of the slurry into the tower, such that the slurry returns to the tower under the force of gravity.

20 Claims, 1 Drawing Sheet

FLUE GAS SCRUBBING APPARATUS

This invention generally relates to gas-liquid contactors used in the removal of particulate matter and gases, such as from utility and industrial flue gases. More particularly, this invention is directed to a gas-liquid contactor which is configured so as to eliminate the requirement for a pump to deliver a contact liquid to the contact section of a gas-liquid contactor, and further configured to have a high velocity section which promotes the absorption of gases and matter by the contact liquid, such that the efficiency of the gas-liquid contactor is increased while simultaneously reducing its operating and maintenance costs.

BACKGROUND OF THE INVENTION

Gas-liquid contactors are widely used to remove substances such as gases and particulate matter from combustion or flue gases produced by utility and industrial plants. Often of particular concern are sulfur dioxide ($SO_2$) and other acidic gases produced by the combustion of fossil fuels and various industrial operations. Such gases are known to be hazardous to the environment, such that their emission into the atmosphere is closely regulated by clean air statutes. The method by which such gases are removed with a spray tower or other type of gas-liquid contactor is known as wet flue gas desulfurization (FGD).

The cleansing action produced by a gas-liquid contactor is generally derived from the passage of gas upwardly through a tower countercurrently to a descending liquid which cleans the air. Wet flue gas desulfurization processes typically involve the use of calcium-based slurries or sodium-based or ammonia-based solutions. As used herein, a slurry is a mixture of solids and liquid in which the solids content can be any desired level, including the extreme condition in which the slurry is termed a moist solid. Examples of calcium-based slurries are limestone (calcium carbonate; $CaCO_3$) slurries and hydrated lime (calcium hydroxide; $Ca(OH)_2$) slurries formed by action of water on lime (calcium oxide; CaO). Such slurries react with the acidic gases to form precipitates which can be collected for disposal or recycling. Intimate contact between the alkaline slurry and acidic gases which are present in the flue gases, such as sulfur dioxide, hydrogen chloride (HCl) and hydrogen fluoride (HF), result in the absorption of the gases by the slurry. Thereafter, the slurry is accumulated in a tank.

A known type of gas-liquid contactor is a spray tower 10 shown in cross-section in FIG. 1. The spray tower 10 generally is an upright structure composed of a tower 14 equipped with an inlet duct 12 through which combustion gases enter the tower 14. Above the inlet duct 12 is a lower bank of spray headers 16 which introduce a spray 20 of an alkaline slurry into the tower 14. A second, upper bank of spray headers 18 is typically provided above the lower bank of spray headers 16, with additional banks of spray headers being used as required for a given application. One or more pumps 26 are required to recycle the alkaline slurry by pumping the slurry from a tank 30 to the banks of spray headers 16 and 18. Each bank of spray headers 16 and 18 may be individually equipped with a pump 26 for the purpose of promoting the flexibility of the pumping and spraying operation to accommodate varying demands by the scrubbing operation.

Intimate contact between the alkaline slurry spray 20 and the flue gases rising through the tower 14 results in a cleansing action, by which the slurry and the entrapped or reacted gases are collected at the bottom of the tower 14 in the tank 30. The cleansed gases which continue to rise through the tower 14 then typically pass through a mist eliminator 22, and thereafter are either heated or passed directly to the atmosphere through a chimney 24.

Due to the large quantity of slurry which must be pumped to scrub the flue gases, a significant cost in the construction, operation and maintenance of gas-liquid contactors is attributable to the pumps 26. Yet, the pumps 26 also constitute a significant limitation to the scrubbing operation, in that the quantity of slurry pumped by the pumps 26 cannot be readily adjusted to accommodate changes in the scrubbing operation, such as the amount of flue gas which must be scrubbed or the amount of contaminants present in the flue gases.

Another limitation of prior art gas-liquid contactors is the relatively low solids content permitted when using a slurry as the cleaning liquid. Typically, the solids content of such slurries must be limited to about ten to about fifteen weight percent. However, higher concentrations would allow the use of a smaller tank 30, since its size is generally dictated by, among other things, the residence time for crystallization of solids within the slurry. Higher solids contents would also eliminate the requirement for primary dewatering devices such as thickeners or hydrocyclones, which are well known devices employed in the art to remove solids and/or byproducts from a slurry. However, high solids contents significantly increase erosion within the tower 14, tank 30, fluid conduit, spray headers 16 and 18 and pump 26, while also increasing the power required to pump the slurry due to the higher specific gravity of the slurry.

Finally, it would be advantageous to maximize the flue gas velocity within the tower 14 from the standpoint of improving contact between the slurry and the flue gases, so as to enable a reduced slurry flow to the tower 14. Higher flue gas velocities would also allow for the use of a tower 14 having a smaller cross-sectional area, such that the cost of constructing the spray tower 10 is reduced. However, conventionally-accepted design practices typically limit the flue gas velocity within the tower 14 to about ten feet per second (about three meters per second) in order to assure the proper operation of the mist eliminator 22. Higher flue gas velocities within the tower 14 tend to increase the gas pressure drop within the tower 14, and therefore increase the likelihood of liquid particles being carried to and flooding the mist eliminator 22.

Those skilled in the art will appreciate that, in view of the considerations noted above, it would be desirable if a flue gas scrubbing apparatus were available which overcame the above-noted disadvantages associated with the use of slurry pumps, yet could employ slurries having higher solids concentrations and higher flue gas velocities.

SUMMARY OF THE INVENTION

It is an object of this invention to provide a flue gas scrubbing apparatus for the removal of particulate matter, sulfur dioxide and other acidic gases, such as from flue gases produced by utility and industrial facilities.

It is a further object of this invention that such a scrubbing apparatus eliminate the requirement for a device to pump a contact liquid which serves to remove gases and particulate matter from the flue gases, and thereby enable the use of high concentration levels of solids within the contact liquid.

It is still a further object of this invention that such a scrubbing apparatus be constructed and configured so as to maximize the velocity of the flue gases while in contact with the contact liquid.

It is another object of this invention that such a scrubbing apparatus operate in a manner which does not adversely effect the operation of devices used to remove liquid particles from the flue gases.

Lastly, it is yet another object of this invention that such a scrubbing apparatus be configured such that its construction, operation and maintenance costs are minimized.

The present invention provides a gas-liquid contactor of the type suitable for removing gases and particulate matter from flue gases produced by utility and industrial plants. The gas-liquid contactor is generally composed of a passage having a lower end and an upper end. The passage may be formed by a tower equipped with an inlet adjacent its lower end through which flue gases are introduced into the tower. The gas-liquid contactor further includes a device which sprays or otherwise introduces a cleansing liquid into the tower above the inlet. The cleansing liquid serves to absorb gases and particulate matter from the flue gases, so as to yield a cleansed flue gas in which liquid particles are suspended. For the removal of sulfur dioxide from flue gases, the cleansing liquid is preferably an alkali slurry characterized by the presence of solids in the cleansing liquid. As a result of the contact between the cleansing liquid and the flue gases, gases and particulate matter are absorbed in the liquid particles.

In accordance with this invention, the tower is sized such that the velocity of the flue gases within the tower is sufficient to carry the liquid particles to a disengagement section located at the upper end of the tower. The disengagement section is adapted to separate the liquid particles from the cleansed flue gas, such that the liquid particles fall out of the air stream and accumulate in a scrubbing tank or other suitable reservoir for containing the cleansing liquid. Importantly, the level of the cleansing liquid within the scrubbing tank is maintained at a level above that of the device which introduces the cleansing liquid into the tower, such that the cleansing liquid is gravity fed to the device without the use of a pump. The gas-liquid contactor preferably includes a mist eliminating device downstream from the disengagement section for removing any remaining liquid particles from the cleansed flue gas. An outlet is disposed further downstream through which the cleansed flue gas escapes the gas-liquid contactor.

A significant advantage of the present invention is that a pump is not required to deliver the cleansing liquid to the device which delivers the cleansing liquid to the tower, because the level of the cleansing liquid is above that of the device. Besides eliminating the added capital, operational and maintenance costs attributable to such pumps, an additional benefit is that the cleansing liquid can have a high solids content without concern for eroding a slurry pump. The higher solids content permitted by this invention allows the size of the scrubbing tank to be less than that typically required by gas-liquid contactors of the prior art by providing equivalent solids residence time through higher alkali densities. Use of the higher concentrations also eliminates the requirement for primary dewatering devices, because the cleansing liquid is already sufficiently concentrated for secondary dewatering devices such as filters and centrifuges.

Another advantage of the present invention is that the velocity of the air stream through the tower can be significantly increased over that practicable with prior art gas-liquid contactors. Because of the relatively high velocities within the tower, improved contact between the cleansing liquid and the flue gases results, such that a reduced slurry flow to the tower can be employed while maintaining a proper cleansing effect. The higher flue gas velocities also allow the tower to have a reduced cross-sectional area, resulting in reduced cost to construct the gas-liquid contactor.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawings, in which.

DETAILED DESCRIPTION OF THE INVENTION

Figure 1:
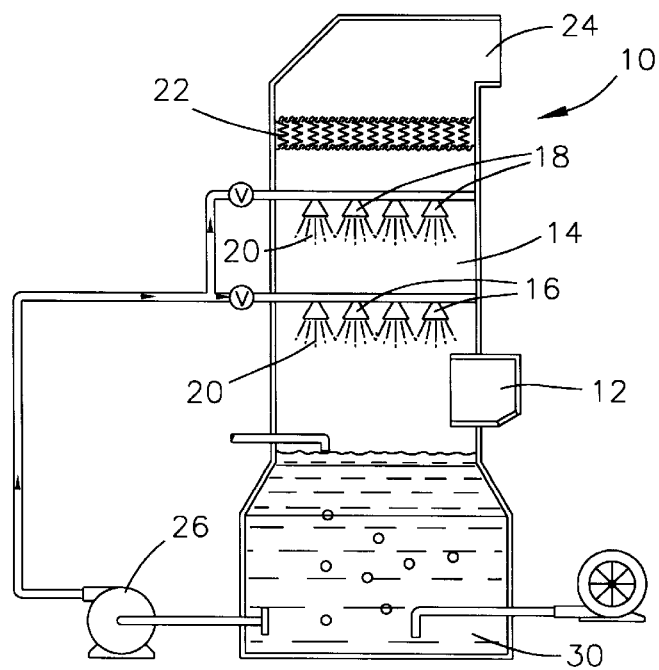
FIG. 1 shows in cross-section a gas-liquid contactor of a type known in the prior art.
Figure 2:
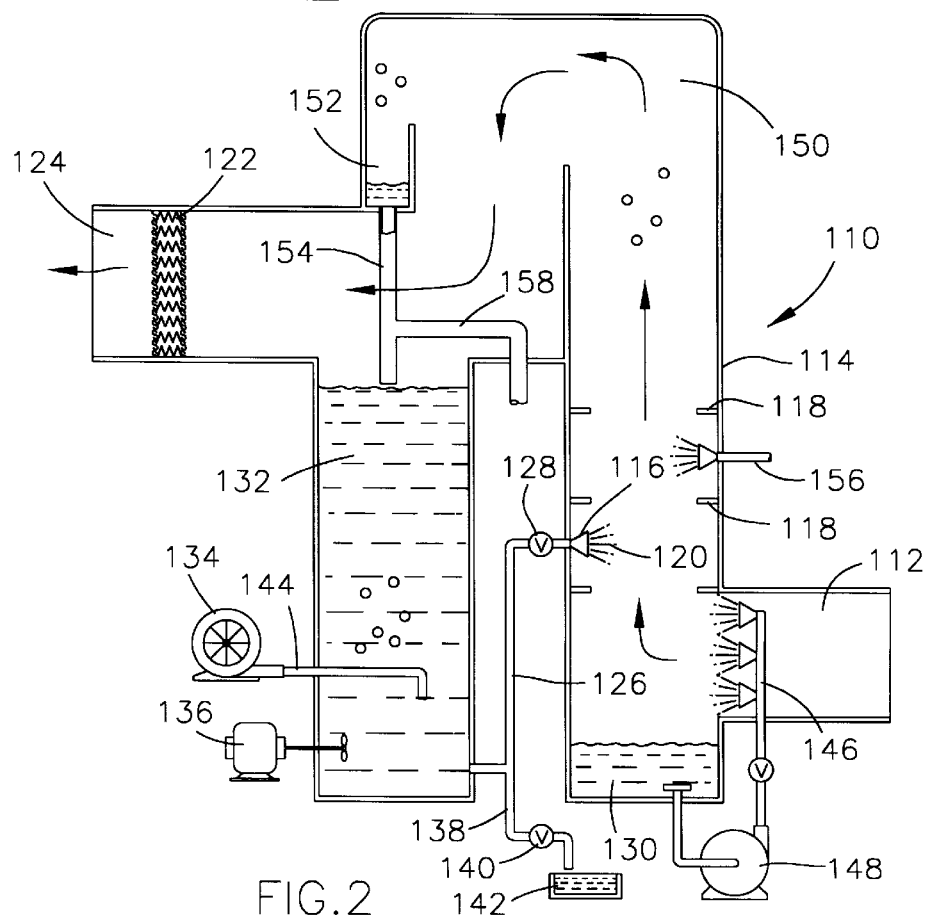
FIG. 2 shows in cross-section a gas-liquid contactor in accordance with a preferred embodiment of this invention.

FIG. 2 illustrates a flue gas scrubber in the form of a spray tower 110 configured in accordance with the teachings of the present invention. As illustrated, the spray tower 110 shares some structural similarities with that of the prior art tower 10 shown in FIG. 1. However, in accordance with this invention, the spray tower 110 is configured to eliminate the requirement for a pump to deliver a cleansing liquid to the spray tower 110 for the primary scrubbing operation, and to enable higher flue gas velocities within the spray tower 110.

While the spray tower 110 is illustrated as being of a particular construction, those skilled in the art will recognize that the teachings of this invention can be readily applied to various other structures and operations which serve as gas-liquid contactors, such as to remove undesirable gases, mist, dust, fumes, smoke and/or particulate matter from a stream of gas. In addition, the teachings of this invention can be extended to devices which introduce a substance to a gas, such as humidifiers or strippers.

The spray tower 110 shown in FIG. 2 generally has an upright structure composed of a tower 114. The lower section of the tower 114 is equipped with an inlet duct 112 which forms an opening at the perimeter of the tower 114 through which flue gases enter the tower 114. The source of the flue gases may be a process involving the combustion of fossil fuels or various industrial operations by which undesirable gases or particulate matter are produced.

As with prior art spray towers of the type illustrated in FIG. 1, a reservoir or tank 130 is formed at the lower end of the tower 114 in which a liquid is held. A pump 148 is fluidically interconnected with the tank 130 for the purpose of delivering the liquid from the tank 130 to a bank of spray headers 146 located in the inlet duct 112. The liquid is sprayed into the intersection of the inlet duct 112 with the tower 114, which generally defines a presaturation section of the spray tower 110. As is known by those skilled in the art, the liquid discharged into the presaturation section serves to quench hot flue gases, and may remove a portion of the particulate matter and some of the gases, primarily hydrogen chloride and hydrogen fluoride, entrained in the flue gases. While spray headers 146 are shown, atomizers of a type known in the art could alternatively be employed in place of the spray headers 146 to deliver an atomized mist into the presaturation section of the spray tower 114.

Though the preferred embodiment of this invention utilizes a presaturation section, this section, including the tank 130, pump 148 and spray headers 146, need not be present or employed in order to realize the operational improvements made possible by this invention. However, the use of a presaturation section is often highly desirable, given the relatively low operating and maintenance costs of the presaturation section and the known operational advantages achieved by quenching the flue gases.

The liquid contained in the tank 130 is not intended to perform the primary cleansing operation. As such, the liquid can be water or another suitable quenching solution, and need not be an alkaline slurry. However, it is foreseeable that a relatively low concentration of alkali could be present in the liquid. After contacting the flue gases, the liquid drains back into the tank 130, where it is recycled by the pump 148 to the spray headers 146. Because the liquid contains at most a small amount of alkali, minimal erosion occurs as the liquid passes through the pump 148 and spray headers 146.

Above the presaturation section and within the tower 114, there is provided at least a second bank of spray headers 116, and foreseeably more banks of spray headers if required or preferred. As shown in FIG. 2, these spray headers 116 are fed with a water-based slurry contained in a second tank 132. As before, atomizers of a type known in the art could alternatively be employed in place of the spray headers 116 to deliver an atomized mist into the spray tower 114. Numerous other types of devices which are capable of introducing a liquid into a gas could also foreseeably be used for this purpose.

The slurry discharged by the second bank of spray headers 116 serves as the primary cleansing medium for the spray tower 110. Accordingly, this slurry is preferably water with a relatively high concentration of alkali, foreseeably in amounts well above the stoichiometric amount for the particular alkali used. For purposes of removing acidic gases and particulate matter from flue gases, the slurry may be composed of lime or limestone suspended in water, though it is foreseeable that other slurry compositions could be used. In addition, the solids content of the slurry can be well in excess of the conventional ten to fifteen weight percent limit imposed by prior art spray towers, with slurries in the form of a moist solid being foreseeable with the spray tower 110 of this invention. Under such conditions, devices other than the spray headers 116 would be used to deliver the slurry to the tower 114.

The slurry is preferably sprayed into the tower 114 so as to provide for intimate contact between the slurry spray 120 and the flue gases rising through the tower 114. Additional alkali in the form of a powder or slurry can be introduced directly into the tower 114 through a conduit 156 or in any other suitable manner so as to replenish the alkali, as may be necessary. The interaction between the slurry and the flue gases yields a cleansed flue gas in which liquid particles are suspended. Absorbed in the liquid particles are substantially the remainder of the particulate matter and gases, such as sulfur dioxide, hydrogen chloride and hydrogen fluoride, entrained in the flue gases.

As an important feature of this invention, the slurry does not flow countercurrently to the flue gas flow, as required by prior art gas-liquid contactors, but instead travels in the same direction as the flue gases within the tower 114. Specifically, the velocity of the flue gases within the tower 114 is sufficiently high so as to carry the liquid particles to a disengagement section 150 located at the upper end of the tower 114, and inhibit the liquid particles from draining down into the first tank 130. For this purpose, a minimum velocity of at least about twenty to twenty-five feet per second (about six to about eight meters per second) is preferred, though it is foreseeable that much higher velocities could be employed. Such velocities can be achieved by appropriately sizing the cross-sectional area of the tower 114 to the quantity of flue gases to be treated, though it is foreseeable that various devices could be employed to increase the velocity of the flue gases within the tower 114.

Shelves 118 attached to the interior walls of the tower 114 are preferably provided in order to further inhibit the liquid particles from agglomerating and draining down along the walls of the tower 114 and into the first tank 130. Detaining the liquid with the shelves 118 allows the flue gases to eventually suspend and transport the liquid to the disengagement section 150, particularly if the tower 114 has a relatively small diameter such that wall effects are significant.

In addition, packing, plates or other structures known in the art can be provided within the tower 114 to promote gas-liquid contact. The use of such structures has the advantageous effect of reducing the overall height of the tower 114 by decreasing the required height of the region within the tower 114 in which absorption of the gases occurs.

The disengagement section 150 is preferably configured such that the velocity within the disengagement section 150 will be approximately the same as in the tower 114. As with phase separation devices known in the art, the disengagement section 150 serves to separate the liquid particles from the cleansed flue gas, and thereafter accumulate the liquid particles in the second tank 132 located below the disengagement section 150. As shown, the disengagement section 150 is configured to cause the liquid particles to impact and flow along the interior surface of the disengagement section 150 toward a trough 152, from which the liquid, now as the slurry, returns to the tank 132 through a pipe 154. Notably, numerous types of separation devices are known which could be employed in place of the structure shown in FIG. 2, such as a hydrocyclone.

As noted previously, the second tank 132 contains the slurry which serves as the primary cleansing medium for the spray tower 110. Within the second tank 132, the sulfur dioxide in the slurry reacts with water to form sulfites ($SO_3^{--}$) and bisulfites ($HSO_3^-$). Importantly, and as illustrated in FIG. 2, the level of the slurry within the second tank 132 is maintained at a level above that of the second bank of spray headers 116. As a result, the slurry can be fed by gravity through a conduit 126 to the second bank of spray headers 116, without the use of a pump. The second tank 132 can also be employed to segregate the slurry, such that the slurry near the top of the tank 132 will be less dense than the slurry which settles closer to the bottom of the tank 132. If desired, the less dense slurry near the top of the tank 132 can be drawn and delivered to the second bank of spray headers 116, while the denser slurry at the bottom of the tank 132 can be used as a filter feed.

While the tank 132 is shown, those skilled in the art will recognize that various other structures could be employed to receive the liquid particles from the disengagement section 150. For example, a crystallizer of a type known in the art could be substituted for the tank 132 so as to control the crystal size of the precipitates which form in the slurry. In addition, a conventional thickening device or dewatering device could be used in place of the tank 132 or, under appropriate circumstances, a simple pipe could be used. In summary, the structure which receives the liquid particles from the disengagement section 150 need not be a reservoir, but can be any structure which can enable the slurry to be appropriately managed and returned to the second bank of spray headers 116.

Branching off from the conduit 126 is a bypass pipe 138 which is adapted to deliver a portion of the slurry to a dewatering device 140, if required due to the type of alkali used. The dewatering device 140 can be of any suitable type known in the art, and is employed to remove excess water from the slurry for the purpose of extracting some of the solids from the slurry. For example, gypsum ($CaSO_4 \cdot 2H_2O$) can be produced as a product of the reaction between sulfates and a calcium-based alkali (e.g., lime or limestone) in the slurry. The slurry can be fed directly to the dewatering device 140 if it contains a sufficiently high solids concentration. The gypsum cake 142 produced by the dewatering device 140 can be reused or otherwise disposed of properly.

A flow control valve 128 is preferably located in the conduit 126 upstream of the second bank of spray headers 116. Advantageously, the flow control valve 128 can be manually or automatically adjusted to regulate the flow of slurry to the second bank of spray headers 116, such that only the amount of slurry necessary to suitably scrub the flue gases need be delivered to the tower 114.

The second tank 132 also preferably includes, though does not necessarily require, an oxidation system for converting the sulfites in the slurry to sulfates ($SO_4^{--}$), thereby promoting the recovery of gypsum as a saleable by-product of the scrubbing operation. The oxidation system may include a blower 134 which injects air into the second tank 132 through a pipe 144. In addition, aerators 136 can be employed which assist in distributing and dissolving the oxygen in the slurry.

Finally, located downstream from the disengagement section 150 is a mist eliminator 122 of any suitable type known in the art. The mist eliminator 122 serves to remove any remaining liquid particles from the cleansed flue gas. Thereafter, the cleansed flue gases pass through a chimney 124, at which point the gases may be heated or exhausted directly into the atmosphere.

In view of the above, it can be seen that a significant advantage of the present invention is that a pump is not required to deliver the slurry to the second bank of spray headers 116 because the level of the slurry within the second tank 132 is above that of the second bank of spray headers 116. As a result, the construction, operation and maintenance costs of the spray tower 110 are significantly less than that for prior art spray towers 110. Furthermore, the elimination of pumps permits the use of the flow control valve 128 so as to tailor the amount of slurry delivered to the tower 114 in accordance with the operating conditions of the spray tower 114.

An additional benefit is that solids contents well in excess of fifteen weight percent and alkali concentrations in excess of the stoichiometric amount can be employed for the slurry. Because of the higher solids content of the slurry, the size of the second tank 132 can be less than that typically required by spray towers of the prior art. The higher solids content within the slurry made possible by this invention also eliminates the requirement for primary dewatering devices that extract byproducts, such as gypsum, from the slurry.

Another significant advantage of this invention is that the velocity of the air stream through the tower 114 is significantly higher than that possible with prior art spray towers. In addition, because of the high velocities within the tower 114, improved contact between the slurry and the flue gases results, such that a reduced flow rate of the slurry to the tower 114 can be employed while maintaining an appropriate cleansing effect. The higher flue gas velocities also allow the tower 114 to have a reduced cross-sectional area, resulting in reduced costs to construct and maintain the spray tower 110.

While our invention has been described in terms of preferred embodiments, it is apparent that other forms could be adopted by one skilled in the art, such as by incorporating the novel features of this invention within gas-liquid contactors which differ structurally and functionally from that shown in the Figures.

For example, the teachings of this invention could be employed in a gas-liquid contactor which does not employ a presaturation section, mist eliminator, forced oxidation system or agitator. Furthermore, a gas-liquid contactor incorporating the teachings of this invention could employ multiple points of entry for the cleansing liquid into the tower 114. If desired, such a contactor could draw the slurry from different levels within the tank 132, such that slurries having different chemistries and solids contents could be selectively introduced at different locations within the tower 114.

Another foreseeable variation would be to employ a hydrocyclone to deliver the slurry from the tank 132 to the tower 114. Advantageously, such an approach would enable a first slurry composition having a relatively high solids content to be delivered near the lower end of the tower, while a second slurry composition having a lower solids content could be introduced at a higher point in the tower, resulting in lower operational costs while efficiently coordinating the introduction of slurry compositions having different solids contents and, therefore, different reaction times and characteristics.

Yet another variation could be to bypass a portion of the liquid from the trough 152 directly to the conduit 126 which delivers the slurry to the tower 114. For this purpose, a bypass pipe 158 (shown in FIG. 2) could be used to divert flow from the pipe 154 to the conduit 126. The advantage here would be the intermixing of the slurry with the liquid, which is very low in pH and high in dissolved bisulfite. In bypassing the tank 132, the liquid increases the dissolved alkalinity of the slurry prior to its entering the tower 114. Control of the flow of liquid through the bypass pipe 158 could foreseeably be achieved in a variety of ways, and would potentially lessen the extent to which the degree of oxidation must be controlled in the tank 132. Such an approach would be difficult to employ in the conventional spray tower 10 of FIG. 1 due to the almost complete mixing of the slurry spray 20 with the slurry in the tank 30.

In addition, the above-described invention could be employed as a single gas contactor stage of an apparatus employing two or more gas contactor stages in parallel or in series. Additional stages can be in accordance with this invention, or can be prior art gas-liquid contactors, or both.

Accordingly, the scope of our invention is to be limited only by the following claims.

What is claimed is:

1. A gas-liquid contactor comprising:

a passage having a lower end and an upper end;

an inlet formed in the passage through which gases containing particulate matter and acidic gases are introduced into the passage, the inlet being located in the passage such that the gases flow from the inlet toward the upper end of the passage;

means for introducing a fluid into the passage so as to produce liquid particles which are entrained in the gases, the introducing means operating to introduce the fluid to the gases as the gases flow upwardly toward the upper end of the passage such that the liquid particles absorb the particulate matter and the acidic gases;

means connected to the upper end of the passage for separating the liquid particles from the gases;

means located beneath the separating means and outside the passage for receiving the fluid from the separating means and returning the fluid to the introducing means under the force of gravity, the receiving and returning means accumulating the fluid at a level above the introducing means and being adapted to remove the particulate matter and the acidic gases from the fluid;

means for maintaining the flow of the gases within the passage at a velocity sufficient to carry substantially all of the liquid particles from the introducing means through the separating means to the receiving and returning means, the maintaining means functioning to prevent the liquid particles from collecting at the lower end of the passage; and an outlet associated with the passage through which the gases escape the gas-liquid contactor.

2. A gas-liquid contactor as recited in claim 1 further comprising means for controlling the flow of the fluid to the introducing means.

3. A gas-liquid contactor as recited in claim 1 wherein the fluid is a water-based slurry containing an alkaline substance.

4. A gas-liquid contactor as recited in claim 3 wherein the alkaline substance is present in the slurry in an amount in excess of the stoichiometric amount for the alkaline substance in water.

5. A gas-liquid contactor as recited in claim 1 further comprising means for presaturating the gases upstream of the introducing means.

6. A gas-liquid contactor as recited in claim 5 further comprising means for returning a second fluid from the passage to the presaturating means.

7. A gas-liquid contactor as recited in claim 1 further comprising means for eliminating mist from the gases.

8. A gas-liquid contactor as recited in claim 1 wherein the receiving and returning means comprises a reservoir for accumulating the fluid, and a fluidic passage interconnecting the reservoir with the introducing means.

9. A gas-liquid contactor as recited in claim 8 further comprising means for removing solids from the fluid prior to the fluid being delivered to the introducing means.

10. A scrubbing apparatus for cleansing flue gases, the scrubbing apparatus comprising:

a tower having a lower end and an upper end;

an inlet located in the tower through which flue gases are introduced into the tower, the inlet being located in the tower such that the flue gases flow upwardly from the inlet toward the upper end of the tower;

means for introducing a slurry into the tower so as to absorb any gases and particulate matter present in the flue gases and thereby yield a cleansed flue gas in which liquid particles are entrained, the introducing means operating to introduce the slurry to the flue gases as the gases flow upwardly toward the upper end of the tower;

a disengagement section connected to the upper end of the tower, the disengagement section being adapted to separate the liquid particles from the cleansed flue gas;

a tank located below the disengagement section and laterally adjacent and externally to the tower, the tank being interconnected to the tower by the disengagement section so as to receive the liquid particles from the disengagement section, the tank accumulating the slurry at a level above the introducing means and being adapted to remove the particulate matter and the acidic gases from the fluid;

means for maintaining the velocity of the flue gases within the tower at a level sufficient to carry substantially all of the liquid particles from the introducing means through the disengagement section to the tank, the maintaining means functioning to prevent the liquid particles from collecting at the lower end of the tower;

a fluidic passage interconnecting the tank with the introducing means so as to return the slurry to the introducing means under the force of gravity; and an outlet disposed adjacent the disengagement section through which the cleansed flue gas escapes the scrubbing apparatus.

11. A scrubbing apparatus as recited in claim 10 further comprising:

a second tank located at the lower end of the tower;

a presaturation section located at the lower end of the tower and above the second tank;

second means for introducing a liquid into the presaturation section so as remove a portion of gases and particulate matter from the flue gases, the liquid thereafter accumulating in the tank; and means for returning the liquid from the second tank to the second introducing means.

12. A scrubbing apparatus as recited in claim 11 wherein the slurry is a water-based slurry containing an alkaline substance, and wherein the liquid has a more dilute concentration of the alkaline substance than the slurry.

13. A scrubbing apparatus as recited in claim 10 wherein the slurry is a water-based slurry containing an alkaline substance.

14. A scrubbing apparatus as recited in claim 13 wherein the alkaline substance is present in the slurry in an amount in excess of the stoichiometric amount for the alkaline substance in water.

15. A scrubbing apparatus as recited in claim 10 further comprising means for eliminating mist from the cleansed flue gas.

16. A scrubbing apparatus as recited in claim 10 wherein the level of the slurry within the tank is above the introducing means within the tower.

17. A scrubbing apparatus as recited in claim 10 further comprising means for removing solids from the slurry prior to the slurry being delivered to the introducing means.

18. A scrubbing apparatus as recited in claim 10 further comprising means for controlling the flow of the slurry to the introducing means.

19. A scrubbing apparatus as recited in claim 10 further comprising barriers disposed within the tower for inhibiting the downward flow of the liquid particles.

20. A scrubbing apparatus for removing gases and particulate matter in flue gases, the scrubbing apparatus comprising:

a tower having a lower end and an upper end;

a first tank located at the lower end of the tower;

an inlet located above the first tank through which flue gases are introduced into the tower, the inlet being located in the tower such that the flue gases flow upwardly from the inlet toward the upper end of the tower;

a presaturation section located at the lower end of the tower and above the first tank;

first means for spraying a liquid into the presaturation section so as to quench the flue gases, the liquid thereafter accumulating in the first tank;

means for returning the liquid from the first tank to the first spraying means;

second means for spraying an alkaline slurry into the tower above the presaturation section so as to absorb gases and particulate matter from the flue gases and thereby yield a cleansed flue gas in which liquid particles are entrained, the second spray means operating to introduce the slurry to the flue gases as the gases flow upwardly toward the upper end of the tower;

a disengagement section located at the upper end of the tower for separating the liquid particles from the cleansed flue gas, the velocity of the flue gases within the tower being sufficient to carry the liquid particles upward from the inlet to the disengagement section the disengagement section being configured to direct the flue gases in a downward direction as the liquid particles are separated from the cleansed flue gas;

a second tank located below the disengagement section and containing the alkaline slurry, the second tank accumulating the alkaline slurry at a level above the second spray means within the tower, the liquid particles falling out of the disengagement section and accumulating in the second tank;

fluid passages interconnecting the second tank with the second spraying means so as to return by gravity the alkaline slurry to the second spraying means;

means for removing solids from the alkaline slurry prior to the alkaline slurry being delivered to the second spray means;

means for eliminating mist from the cleansed flue gas; and a chimney disposed adjacent the disengagement section through which the cleansed flue gas escapes the scrubbing apparatus.

* * * * *